US006982847B2

(12) United States Patent
Bjork et al.

(10) Patent No.: US 6,982,847 B2
(45) Date of Patent: Jan. 3, 2006

(54) METHOD AND APPARATUS FOR IMPLEMENTING AUTONOMOUS VARIATION OF MEDIA DISMOUNT TIME IN A ROBOTIC MEDIA LIBRARY

(75) Inventors: Thomas Alan Bjork, Rochester, MN (US); Leon Edward Gregg, Rochester, MN (US); James Lawrence Tilbury, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 10/667,025

(22) Filed: Sep. 18, 2003

(65) Prior Publication Data

US 2005/0063085 A1    Mar. 24, 2005

(51) Int. Cl.
G11B 15/18 (2006.01)
G11B 17/00 (2006.01)
(52) U.S. Cl. .......................................... 360/69; 360/31
(58) Field of Classification Search ............... 360/69, 360/71, 31, 73.01; 711/113, 118, 133, 159, 711/111, 112, 134, 136, 154, 156, 167
See application file for complete search history.

(56) References Cited

U.S. PATENT DOCUMENTS 5,239,650 A * 8/1993 Hartung et al. ................ 710/8
5,983,318 A * 11/1999 Willson et al. ............. 711/113

* cited by examiner

Primary Examiner—David Hudspeth
Assistant Examiner—Jason Olson
(74) Attorney, Agent, or Firm—Joan Pennington

(57) ABSTRACT

A method, apparatus and computer program product are provided for implementing autonomous variation of media dismount time in a robotic media library. I/O requests to the robotic media library are monitored. Performance statistics are gathered for the I/O requests to the robotic media library. The gathered performance statistics are periodically checked to determine if a change is needed for the media dismount time. The gathered performance statistics include a media hit count of where a data storage medium (DSM) for an I/O request is in a robotic media drive, and a media near miss count where the DSM for the I/O request is in transit from the robotic media drive.

14 Claims, 5 Drawing Sheets

METHOD AND APPARATUS FOR IMPLEMENTING AUTONOMOUS VARIATION OF MEDIA DISMOUNT TIME IN A ROBOTIC MEDIA LIBRARY

FIELD OF THE INVENTION

The present invention relates generally to the data processing field, and more particularly, relates to a method, apparatus and computer program product for implementing autonomous variation of media dismount time in a robotic media library.

DESCRIPTION OF THE RELATED ART

An automated storage library or robotic media library typically includes a plurality of storage bins or slots for retaining data storage media, such as magnetic tapes, magnetic disks, or optical disks, and also has a robotic picker mechanism for picking or gripping a cartridge containing the data storage medium and moving the cartridge between a storage position and an input output device or drive.

In a robotically operated media library there are typically one or a few drives that can read and write the media and there are many storage locations for the media. When media are used more or less randomly, this immediately leads to a problem deciding which media to remove from a drive, and when to remove it.

It is not necessarily advantageous to remove a data storage medium immediately when it is no longer used because the next request might use that same data storage medium. In fact, it is often the case that the next request is for the same data storage medium. Then after some number of requests a different data storage medium often will be used.

Considering the probability of multiple users following a similar use pattern, it is nearly impossible to determine exactly when the last reference to a data storage medium has been made. So, after any use of a data storage medium it is prudent to wait some period of time before removing that data storage medium from the drive. A problem exists in selecting that delay time. If the data storage medium is removed too soon, then the same data storage medium will just be returned to the drive because it is still actually needed. If data storage medium is left in the drive too long, then throughput is reduced because the drive is left inactive just waiting for another use that may never arrive.

The problem therefore is to correctly set the time that a data storage medium is left in the drive after an I/O operation, possibly the last I/O operation using that data storage medium, has completed. This time value typically has been set manually by observation of how things seem to be working.

A need exists for a mechanism to set the media dismount time value autonomously, advantageously having the benefits of greater precision and less user involvement.

SUMMARY OF THE INVENTION

A principal object of the present invention is to provide a method, apparatus and computer program product for implementing autonomous variation of media dismount time in a robotic media library. Other important objects of the present invention are to provide such method, apparatus and computer program product for implementing autonomous variation of media dismount time in a robotic media library substantially without negative effect and that overcome many of the disadvantages of prior art arrangements.

In brief, a method, apparatus and computer program product are provided for implementing autonomous variation of media dismount time in a robotic media library in a computer system. I/O requests to the robotic media library are monitored. Performance statistics are gathered for the I/O requests to the robotic media library. The gathered performance statistics are periodically checked to determine a change value needed for the media dismount time.

In accordance with features of the invention, the gathered performance statistics include a media hit count of where a data storage medium (DSM) for an I/O request is in a robotic media drive, and a media near miss count where the DSM for the I/O request is in transit from the robotic media drive. After a first threshold number of I/O requests, the gathered performance statistics are checked to determine if an increase is needed for the media dismount time. For example, if the near miss count is greater than the hit count or if a ratio of the near miss count and hit count is greater than a set value, then the media dismount time is increased. After a second threshold number of I/O requests, the gathered performance statistics are checked to determine if a decrease is needed for the media dismount time. For example, if the near miss count is near zero or if a ratio of the near miss count and hit count is less than another set value, then the media dismount time is decreased.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
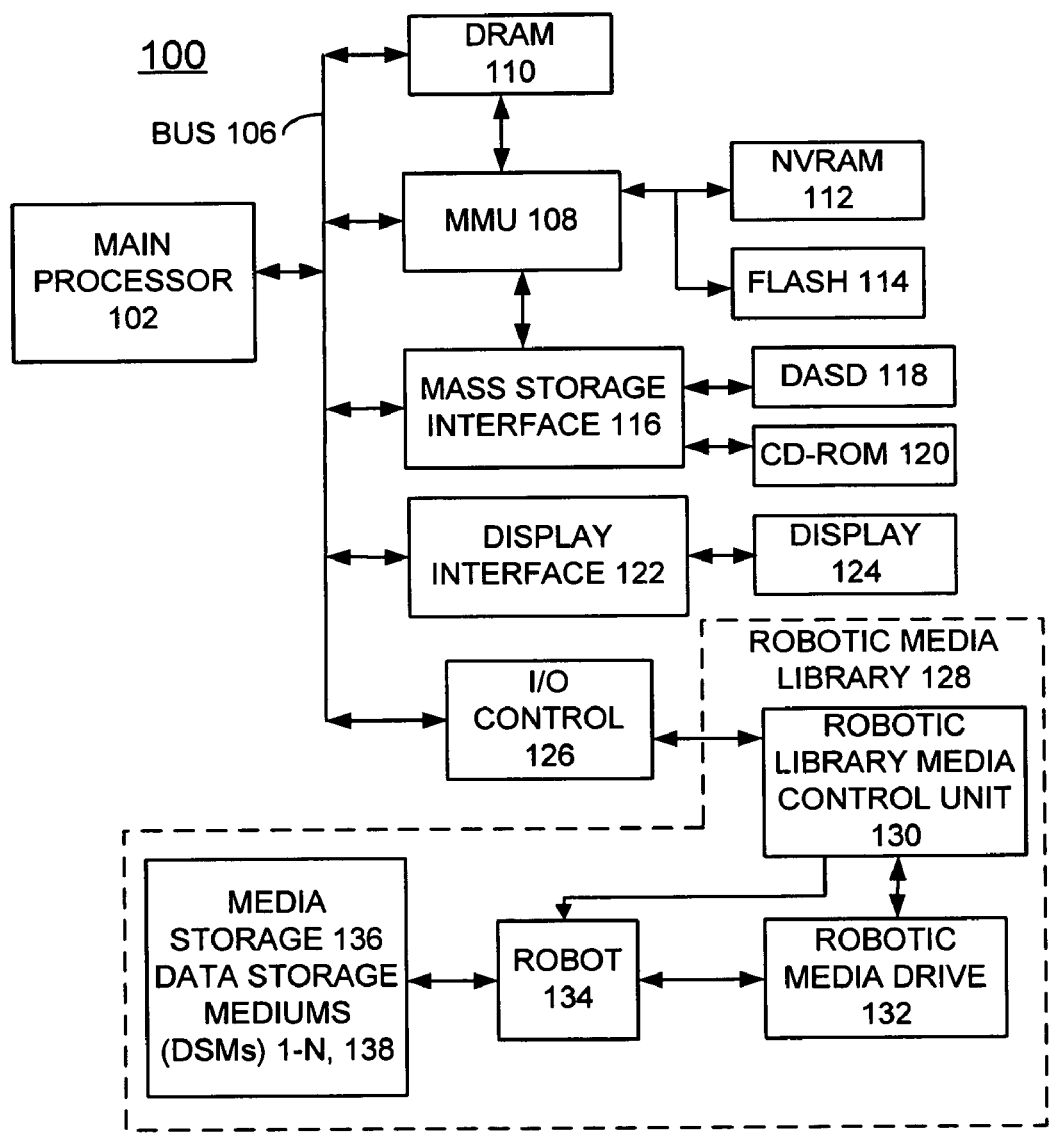
FIGS. 1A and 1B are block diagram representations illustrating a computer system and operating system for implementing autonomous variation of media dismount time in a robotic media library in accordance with the preferred embodiment.
Figure 1B:
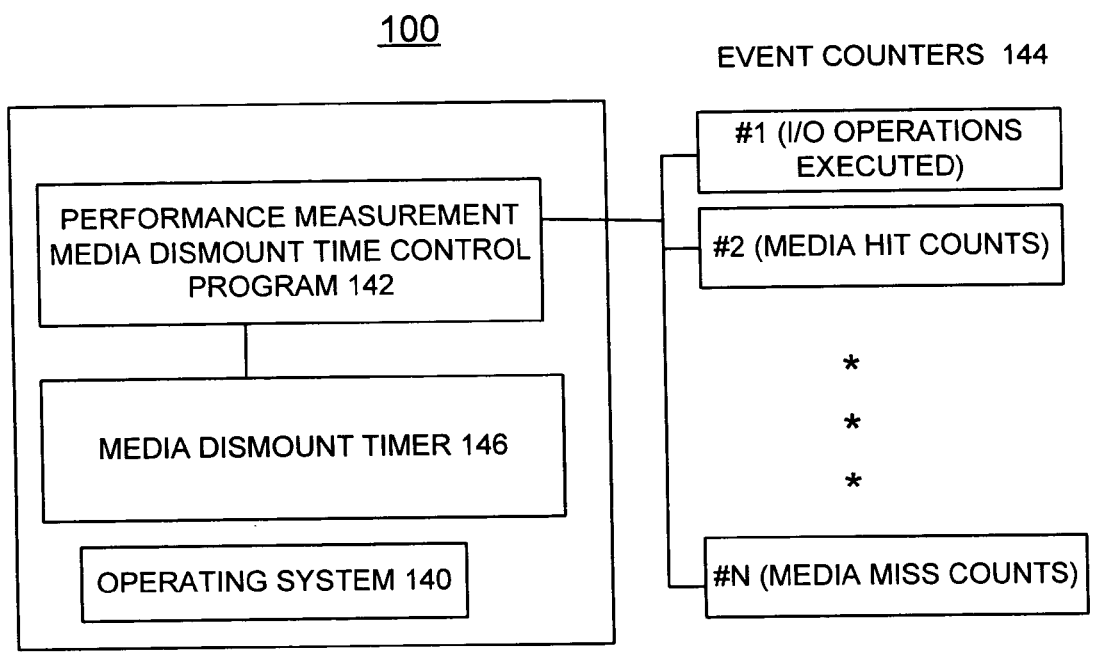

Referring now to the drawings, in FIGS. 1A and 1B there is shown a computer system generally designated by the reference character 100 for implementing autonomous variation of media dismount time in accordance with the preferred embodiment. Computer system 100 includes a main processor 102 or central processor unit (CPU) 102 coupled by a system bus 106 to a memory management unit (MMU) 108 and system memory including a dynamic random access memory (DRAM) 110, a nonvolatile random access memory (NVRAM) 112, and a flash memory 114. A mass storage interface 116 coupled to the system bus 106 and MMU 108 connects a direct access storage device (DASD) 118 and a CD-ROM drive 120 to the main processor 102. Computer system 100 includes a display interface 122 connected to a display 124, and an input/output (I/O) control 126 coupled to the system bus 106. A robotic media library 128 is coupled to the I/O control 126. The robotic media library 128 includes a robotic library media control unit 130 for controlling operations in the library 128. The robotic library media control unit 130 manages the reading and writing onto a data storage medium in a robotic media drive 132 and manages the accessing of the data storage medium by a robot 134. The robotic library media control unit 130 manages the operation of a media storage unit 136 that is adapted to receive a plurality of removable data storage mediums (DSMs) 1-N, 138 that may include magnetic tapes, magnetic disks, and optical disks.

Computer system 100 is shown in simplified form sufficient for understanding the present invention. The illustrated computer system 100 is not intended to imply architectural or functional limitations. The present invention can be used with various hardware implementations and systems and various other internal hardware devices, for example, multiple main processors.

As shown in FIG. 1B, computer system 100 includes an operating system 140, and a performance measurement media dismount time control program 142 of the preferred embodiment. A plurality of event counters 144, #1-#N and a media dismount timer 146 are coupled to and operatively controlled by the performance measurement media dismount time control program 142 in accordance with the preferred embodiment. Events that can be counted by the event counters 144, #1-#N include, for example, a number of I/O operations executed, a number of media hit counts where the DSM 138 for an I/O request is in the I/O media drive 132, and a number of media near miss counts where the DSM 138 for I/O request is in transit from the I/O media drive 132 in accordance with the preferred embodiment.

In accordance with features of the preferred embodiment, autonomous variation of media dismount time in the robotic media library 128 is provided by the performance measurement media dismount time control program 142. The performance measurement media dismount time control program 142 of the preferred embodiment gathers performance statistics and implements autonomous variation of media dismount time in accordance with the preferred embodiment. Also this additional data collection is implemented without adding significant overhead.

In accordance with features of the preferred embodiment, a determination is made of the number of I/O requests which are immediately satisfied because the requested DSM 138 is in input output media drive 132 ready for access or a hit count is maintained. One count that is particularly important is the count of near misses. More specifically, this is the count of requests that arrive just after a decision has been made to remove a DSM 138 from the input output media drive 132. In this specific case the near miss count includes a transit time while the media is being moved to a storage location after being removed from the robotic media drive 132. This near miss count definition is used because it is easy to determine with essentially no extra overhead.

It should be understood that other statistics could be gathered to manage the media dismount delay time in accordance with features of the preferred embodiment, for example, another count that is useful is the count of requests that arrive just in time. More specifically, this is the count of requests that arrive when there is predefined timer interval left before the media would be removed from the input/output device. While it may be instructive to count the number of misses, requests which cannot be satisfied because it is necessary to swap media in the input output devices, but a count by media the number of misses is not maintained since this would require an extensive data collection table that at all times includes all DSMs 138 in the library 128.

In accordance with features of the preferred embodiment, modifying the dismount delay time advantageously minimizes the number of near misses. A near miss is very costly to overall performance. To remove a DSM 138, store the DSM 138 in media storage unit 136, and then reverse the process to return the DSM 138 to an input output drive 132 can easily cost 20 to 30 seconds of elapsed time, a very significant delay in terms of computer speeds. While being just a bit slower to remove a DSM 138 can delay subsequent I/O requests by an increased dismount delay time, such increased delay time is a small number of seconds. We can easily generalize to say that removing a DSM 138 too soon is at least 10 times as costly as leaving a drive idle for a brief period. Therefore the goal of the performance measurement media dismount time control program 142 is to essentially eliminate near misses, possibly at the cost of a small amount of excess delay in removing the DSM 138 from the input output drive 132.

In accordance with features of the preferred embodiment, using only the counts of hits and near misses, an algorithm is implemented to modify the dismount delay time. Periodically the counts of hits and near misses are examined, the ratio of the two counts is determined, and the dismount delay timer is autonomously varied based upon the performance counts of hits and near misses.

Figure 2:
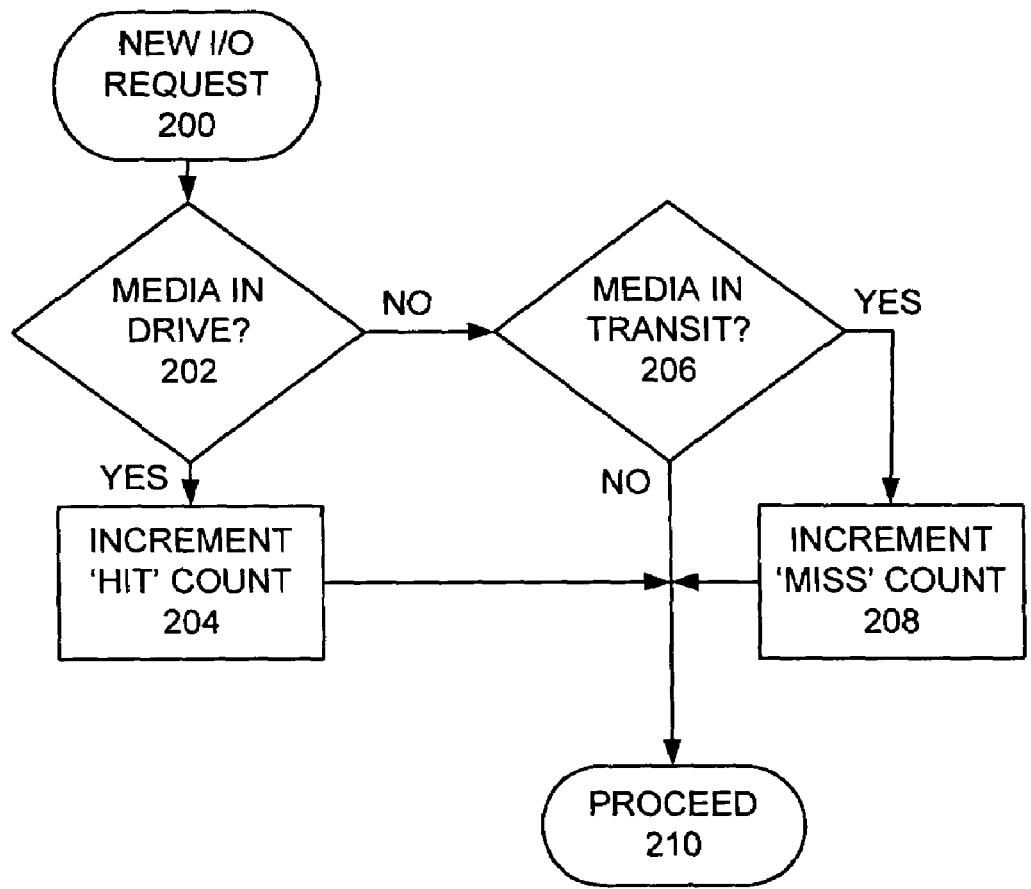
FIGS. 2 and 3 are flow charts illustrating exemplary steps for implementing autonomous variation of media dismount time in a robotic media library of the computer system of FIG. 1 in accordance with the preferred embodiment.
Figure 3:
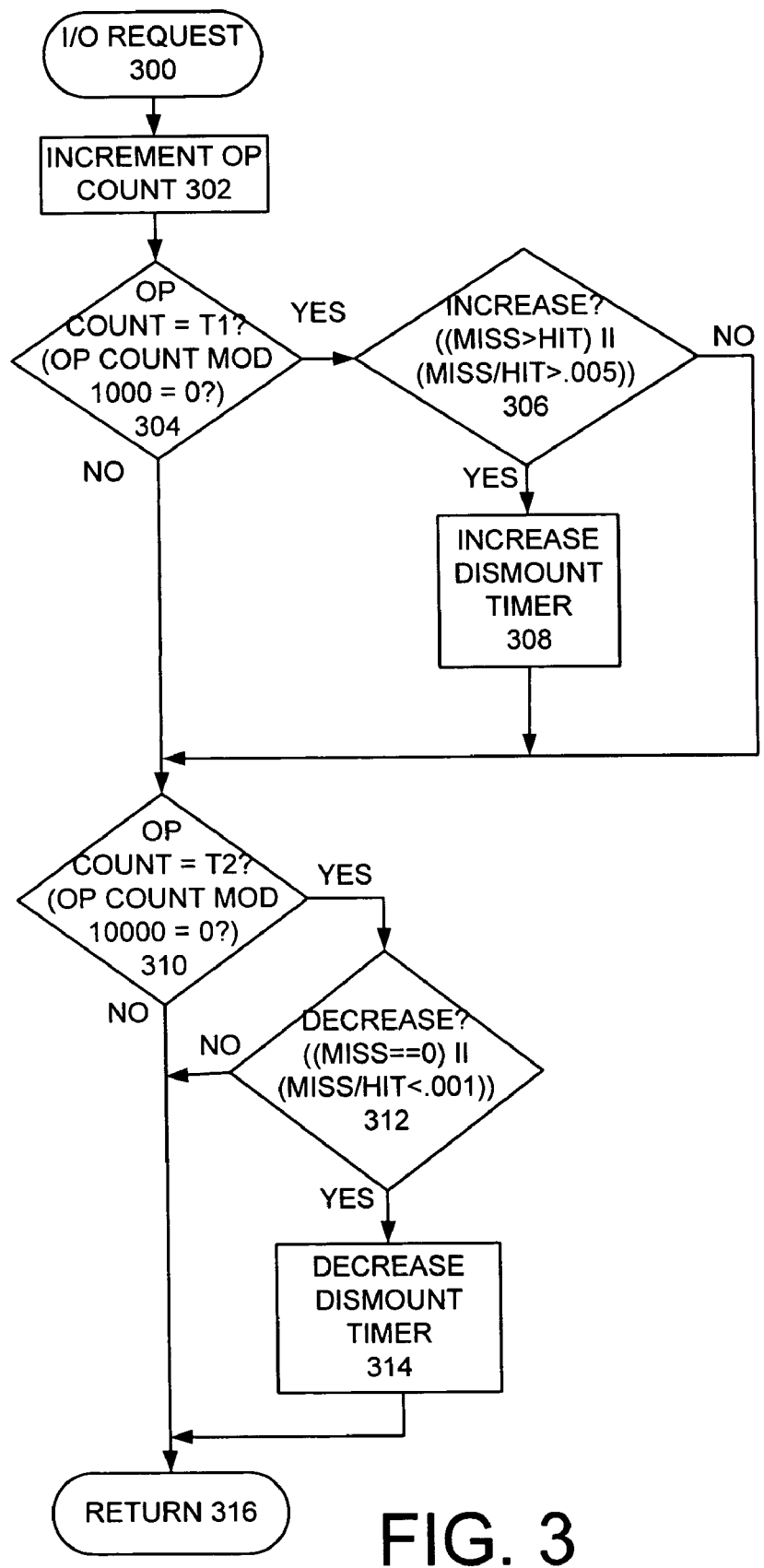

Referring now to FIGS. 2 and 3, there are shown exemplary steps for implementing autonomous variation of media dismount time in the robotic media library 128 of the computer system 100 in accordance with the preferred embodiment. In FIG. 2 there are shown exemplary steps for gathering performance statistics used to implement autonomous variation of media dismount time. A new I/O request is received as indicated in a block 200. Checking for a media in the drive 132 is performed as indicated in a decision block 202. For example, a total duration of operations for a media in the drive 132 can be measured; or preferably operations that are relatively early in a mount sequence are ignored by including a residual value of the dismount timer in the media in drive test. When a media is in the I/O drive 132, then the hit count is incremented as indicated in a block 204. When the media is not in the I/O drive 132, then checking for media in transit is performed as indicated in a decision block 206. The media in transit can be detected in a number of ways. For example, one implementation is to maintain both a current location of the robot 134 and target of move location of the media storage unit 136. If the media is in transit, then the miss count is incremented as indicated in a block 208. Otherwise, when the media is not in transit, then the steps for gathering performance statistics proceed as indicated in a block 210 without incrementing either the hit or miss count.

In FIG. 3 there are shown exemplary steps for implementing autonomous variation of media dismount time based upon the gathered performance statistics. A new I/O request is received as indicated in a block 300. The operations count is incremented as indicated in a block 302. Checking whether the operations count equals a first threshold number T1, for example, each 1000th operation, is performed as indicated in a decision block 304. When the operations count equals the first threshold number T1, then checking whether to increase the media dismount timer value is performed as indicated in a decision block 306. For example, the test to determine if the dismount delay time should be increased is if the near miss count is greater than the hit count or if a ratio of the near miss count and hit count is greater than 0.005. If the increase media dismount timer test is satisfied, then the media dismount timer 146 is increased as indicated in a block 308. Otherwise checking whether the operations count equals a second threshold number T2, for example, each 10,000th operation, is performed as indicated in a decision block 310. When the operations count equals the second threshold number T2, then checking whether to decrease the media dismount timer value is performed as indicated in a decision block 312. For example, the test to determine if the dismount delay time should be decreased is if the near miss count is near zero or if the ratio of the near miss count and hit count is less than 0.001. If the decrease media dismount timer test is satisfied, then the media dismount timer 146 is decreased as indicated in a block 314. Then the steps for implementing autonomous variation of media dismount time return as indicated in a block 316.

Figure 4:
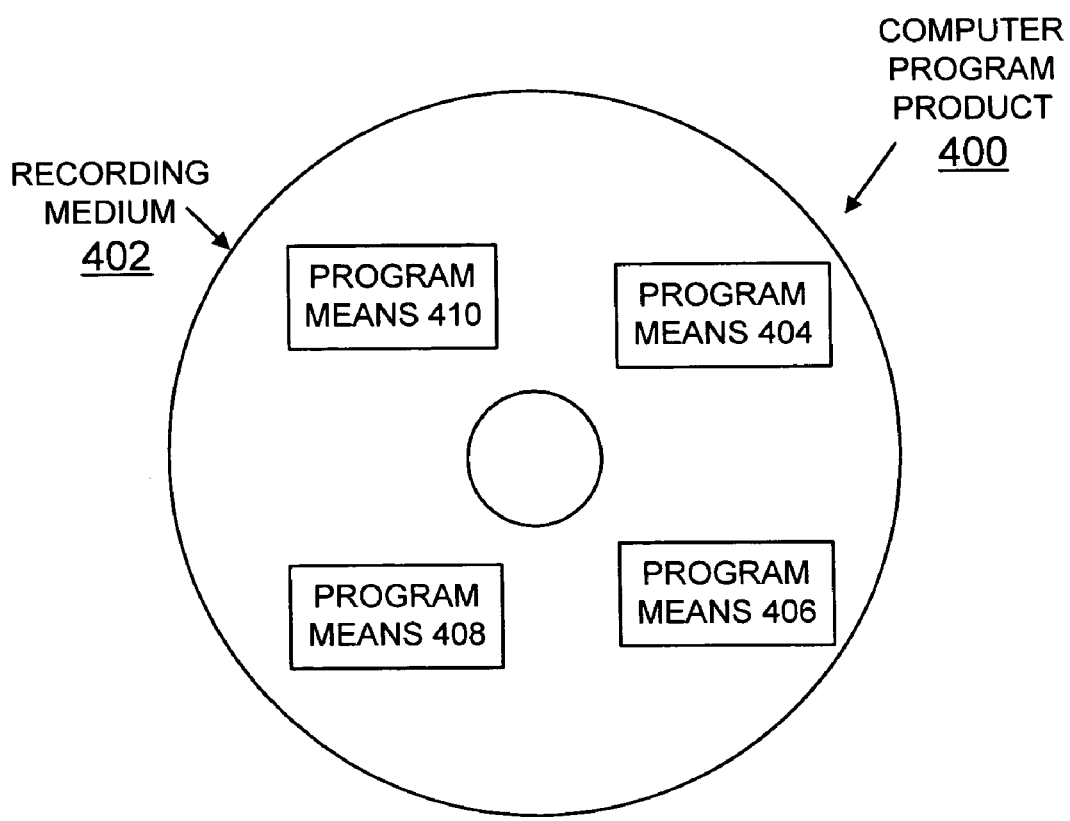
FIG. 4 is a block diagram illustrating a computer program product in accordance with the preferred embodiment.

Referring now to FIG. 4, an article of manufacture or a computer program product 400 of the invention is illustrated. The computer program product 400 includes a recording medium 402, such as, a floppy disk, a high capacity read only memory in the form of an optically read compact disk or CD-ROM, a tape, a transmission type media such as a digital or analog communications link, or a similar computer program product. Recording medium 402 stores program means 404, 406, 408, 410 on the medium 402 for carrying out the methods for implementing autonomous variation of media dismount time of the preferred embodiment in the system 100 of FIG. 1.

A sequence of program instructions or a logical assembly of one or more interrelated modules defined by the recorded program means 404, 406, 408, 410, direct the computer system 100 for implementing autonomous variation of media dismount time of the preferred embodiment.

While the present invention has been described with reference to the details of the embodiments of the invention shown in the drawing, these details are not intended to limit the scope of the invention as claimed in the appended claims.

What is claimed is:

1. A method for implementing autonomous variation of media dismount time in a robotic media library comprising the steps of:
   monitoring input/output (I/O) requests to the robotic media library and maintaining an I/O operations count,
   gathering performance statistics for said I/O requests to the robotic media library;
   periodically checking said gathered performance statistics to determine said change value needed for the media dismount time including identifying a first threshold number of I/O requests, and checking said gathered performance statistics to determine if an increase is needed for the media dismount time.

2. A method for implementing autonomous variation of media dismount time as recited in claim 1 wherein the step of gathering performance statistics includes the steps of maintaining a media hit count where a data storage medium (DSM) for said I/O request is in a robotic media drive.

3. A method for implementing autonomous variation of media dismount time as recited in claim 2 includes the steps of maintaining a media near miss count where said DSM for said I/O request is in transit from said robotic media drive.

4. A method for implementing autonomous variation of media dismount time as recited in claim 1 includes the step of determining said increase is needed for the media dismount time if the near miss count is greater than the hit count; or if a ratio of the near miss count and hit count is greater than a set value.

5. A method for implementing autonomous variation of media dismount time as recited in claim 1 includes the step of identifying a second threshold number of I/O requests, checking said gathered performance statistics to determine if a decrease is needed for the media dismount time.

6. A method for implementing autonomous variation of media dismount time as recited in claim 5 includes the step of determining said decrease is needed for the media dismount time if the near miss count is near zero, or if a ratio of the near miss count and hit count is less than another set value.

7. Apparatus for implementing autonomous variation of media dismount time in a robotic media library comprising:
   a plurality of event counters;
   a performance measurement media dismount time control program for monitoring input/output (I/O) requests to the robotic media library, for controlling said event counters to maintain a count of I/O operations executed, a count of media hits where a data storage medium (DSM) for said I/O request is in a robotic media drive, and a count of media near misses where the DSM for said I/O request is in transit from said robotic media drive;
   said performance measurement media dismount time control program for periodically checking said counts of media hits and media near misses to determine a change value needed for the media dismount time includes said performance measurement media dismount time control program identifying a first threshold number of I/O requests, and checking said counts of media hits and media near miss to determine if an increase is needed for the media dismount time.

8. Apparatus for implementing autonomous variation of media dismount time in a robotic media library as recited in claim 7 wherein said performance measurement media dismount time control program increases the media dismount time if the near miss count is greater than the hit count, or if a ratio of the near miss count and hit count is greater than a set value.

9. Apparatus for implementing autonomous variation of media dismount time in a robotic media library as recited in claim 7 wherein said performance measurement media dismount time control program for periodically checking said counts includes said performance measurement media dismount time control program identifying a second threshold number of I/O requests, checking said counts of media hits and media near miss to determine if a decrease is needed for the media dismount time.

10. Apparatus for implementing autonomous variation of media dismount time in a robotic media library as recited in claim 9 wherein said performance measurement media dismount time control program decreases the media dismount time if the near miss count is near zero, or if a ratio of the near miss count and hit count is less than a set value.

11. A computer program product for implementing autonomous variation of media dismount time product embodied upon a computer-readable medium in a robotic media library in a computer system, said computer program product including instructions executed by the computer system to cause the computer system to perform the steps of:
   defining a set of event counters;
   monitoring input/output (I/O) requests to the robotic media library,
   controlling said event counters to maintain a count of I/O operations executed, a count of media hits where a data storage medium (DSM) for said I/O request is in a robotic media drive, and a count of media near misses where the DSM for said I/O request is in transit from said robotic media drive;

periodically checking said counts of media hits and media near misses to determine a change value needed for the media dismount time includes the steps of identifying a first threshold number of I/O requests, and checking said counts of media hits and media near miss to determine if an increase is needed for the media dismount time.

12. A computer program product for implementing autonomous variation of media dismount time as recited in claim 11 wherein the step of checking said counts of media hits and media near miss to determine if an increase is needed for the media dismount time includes at least one step of checking if the near miss count is greater than the hit count or checking if a ratio of the near miss count and hit count is greater than a set value.

13. A computer program product for implementing autonomous variation of media dismount time as recited in claim 11 includes the steps of identifying a second threshold number of I/O requests, checking said counts of media hits and media near miss to determine if a decrease is needed for the media dismount time.

14. A computer program product for implementing autonomous variation of media dismount time as recited in claim 13 wherein the step of checking said counts of media hits and media near miss to determine if a decrease is needed for the media dismount time includes at least one step of checking if said near miss count is near zero or checking if a ratio of the near miss count and hit count is less than a set value.

* * * * *